United States Patent [19]

Zimmermann et al.

[11] 3,854,241

[45] Dec. 17, 1974

[54] PROCESS FOR SOIL IMPROVEMENT

[76] Inventors: Friedrich Zimmermann, Striegaustrasse 12, 3300 Braunschweig; Ernst Seifert, Otto-Palm-Strasse 6, 3100 Celle; Helmut von Freyhold, Salierplatz 2, 4000 Dusseldorf-Oberkassel, all of Germany; Arnold Saxen, deceased, late of Abt-Jerusalem-Strasse 6, 3300 Braunschweig, Germany; Elke Carsch, nee Saxen, executrix, 19 Schnellstrasse, Husum, Germany

[22] Filed: Feb. 29, 1972

[21] Appl. No.: 230,495

[30] Foreign Application Priority Data
Sept. 13, 1968  Austria................................ A 8947

Related U.S. Application Data

[63] Continuation-in-part of Ser. No. 858,910, Sept. 12, 1969, abandoned.

[52] U.S. Cl............................. 47/58, 47/DIG. 10
[51] Int. Cl............................................ A01b 79/02
[58] Field of Search ............. 47/58, DIG. 10; 71/1

[56] References Cited
UNITED STATES PATENTS

| | | | |
|---|---|---|---|
| 1,667,923 | 5/1928 | Bishop | 47/58 X |
| 2,702,966 | 3/1955 | Boyd | 47/58 |
| 2,741,876 | 4/1956 | Paoloni | 47/58 |
| 2,773,330 | 12/1956 | Erwin | 47/58 |
| 2,799,973 | 7/1957 | Smith | 47/58 |
| 2,816,396 | 12/1957 | Ross et al. | 47/58 |
| 2,816,397 | 12/1957 | Becker | 47/58 |
| 3,337,989 | 8/1967 | Harmon | 47/58 |

*Primary Examiner*—Robert E. Pulfrey
*Assistant Examiner*—E. M. Coven
*Attorney, Agent, or Firm*—Hammond & Littell

[57] ABSTRACT

A process for improving clayey soils for cultivation consisting essentially of incorporating a carbonate of calcium into clayey soils and inducing a gas formation in said soils by chemical reaction by an acidic treatment of said soil with an acidic material containing a silicon compound, in approximately stoichiometric amounts based on the carbon dioxide content of said carbonate of calcium, whereby porous aggregates are built up.

5 Claims, No Drawings

PROCESS FOR SOIL IMPROVEMENT

REFERENCE TO A PRIOR APPLICATION

This application is a continuation-in-part of our copending U.S. patent application Ser. No. 858,910 filed Sept. 12, 1969 and now abandoned.

THE PRIOR ART

It is known that soils which developed from carbonaceous sediments, on agricultural usage over particularly long periods of time, have a good structure which is not only characterized by a natural bonding of the clayey coagulate in stable aggregates but also by their porosity. The best example for this are the younger carbonaceous loess soils whose stable crumbs result in a particularly good hydrodynamic and plant nutrition dynamic of the soil. Contrary to this, many heavy clay soils with a high clay content which have been leached, and clay-rich sloping virgin soils on medium altitude mountains have no useful structure. The clayey particles of the aged cultivated surface soils as well as the clayey particles of the mountains virgin soils, produced by weathering, have a strong tendency to mud formation.

It has already been suggested, to incorporate calcium carbonate in soils together with substances, which liberate carbon dioxide. Particularly, acid-producing bacteria have been suggested for this. It has also been attempted to improve soils by the addition of silicates, particularly potassium silicates. The densely seated particles are dispersed thereby, and an increase of the pore volume is attained. However a stability of the crumbs of the thus treated soil is not effected by this treatment. Also in this process, which works without gas evolution, no loosening of the soil is effected.

OBJECTS OF THE INVENTION

An object of the invention is to improve so-called heavy cultivated soils and clay-rich virgin soils by the production of porous aggregates through addition of gas-producing chemicals to the soils.

Another object of the invention is the development of a process for improving clayey soils for cultivation consisting essentially of incorporating from 20 to 750 gm/m$^2$ of a carbonate of calcium into clayey soils and inducing a gas formation in said soils by chemical reaction by an acidic treatment of said soil with an acidic material selected from the group consisting of acidic silica sols, acid-adjusted alkali metal silicate suspensions and mixtures of alkali metal silicates and acidic calcium phosphates, in approximately the stoichiometric amount based on the carbon dioxide content of said carbonate, whereby porous aggregates are built up.

These and other objects of the invention will become more apparent as the description thereof proceeds.

DESCRIPTION OF THE INVENTION

It has now been found that the texture of the so-called heavy cultivated soils, as well as those of clay-rich virgin soils can be essentially improved by using the process of the invention. This process is characterized in that by addition of acidic agents containing silicon compounds causing the decomposition of carbonates of calcium previously introduced into the soil, thus a carbon dioxide gas formation is induced in the soil. This gas formation can, if necessary, be brought to an increased effect on the soil particles by soil tilling.

Suitable carbonates of calcium which decompose under acidic treatment with formation of carbon dioxide are calcium carbonate, if necessary, in the form of carbonaceous rocks, or double carbonates such as dolomite. The addition of these products is done in a finely ground state, preferably by thoroughly mixing and incorporating into the top layer of soil, such as by rototilling. The amount depends upon the quality of the soil, and amounts generally between 20 to 750 gm/m$^2$, are incorporated into the soil.

The gas formation can be induced by further addition and incorporation of acidic silicon-containing compounds in solid or liquid form to the soil.

The special realization of the process consists in adding to the soil, as acidic silicon-containing substances, acidic silica sols and/or acidic-adjusted alkali metal silicate suspensions and/or mixtures of alkali metal silicates and acidic calcium phosphates to induce $CO_2$ gas formation. The acidic-adjustment of the silica sols and the silicate suspensions is suitably done with phosphoric acid. In principle, however, any acidic substance can be used, such as other inorganic acids such as sulfuric acid or hydrochloric acid or organic acids capable of giving the desired pH range. It is, however, appropriate to use such products which for other reasons are favorable for the structure and the nutritional content of the soil, as phosphoric acid or the acidic phosphates, preferably acid calcium phosphates (superphosphates and triplephosphates). Appropriately, approximately stoichiometric amounts based on the $CO_2$ content of the carbonate utilized are used. The reaction between these compounds starts relatively quickly in the soil, particularly if the latter is moist. The acidic silicon-containing substances can, however, also be added to the soil in liquid form, e.g., by spraying.

In using the acid-adjusted silicate suspensions it is appropriate to work with high dilutions, as, for example, from 3 to 10 percent solutions, in order to avoid agglomeration, or, respectively, to prepare the suspensions only immediately before use. For this purpose alkali metal silicates such as potassium and sodium silicates can be used. The mol ratio of alkali oxide to $SiO_2$ can vary to a large extent in these silicates. Preferably, commercial products in a mol ratio of from 1:2 to 1:6 are used. A certain stabilization of the alkali metal silicate solutions can be obtained by an addition of urea in amounts of from 1 to 5 percent, based on the solid content of the alkali metal silicates.

In so far as acidic silica sols and/or acidic adjusted silicate suspensions are used, the appropriate pH range is between 2 and 5.

The acid treatment with acidic silicon-containing substances can also be conducted by adding to the carbonate of calcium treated soil a solid mixture of an alkali metal silicate and an acidic calcium phosphate. Such a treatment is preferable in the spring when an ample supply of water is assured to effect the solution and chemical reaction of the reactants to give a carbon dioxide gas evolution.

It has been proven advantageous, particularly if the separate components are not added in solid form, to bring about an increased effect of the gas formation on the soil particles by soil tilling. Through the volume increasing effect of the gas phase, a build-up of porous aggregates is accomplished, not only in cultivated soils whose aggregates break down easily, but also in virgin soils with high clay content.

The following examples are illustrative of the practice of the invention without, however, being limitative in any respect.

EXAMPLE I

On a test field with muddy clay soil, deficient in lime, the arable soil shows slate-like and coherent sttuctures. Less than 10 percent of the soil volume are coarse pores ($<10\mu$). After the expansion due to frost, the soil easily gets muddy and moist. The taking up of moisture leads to a quick stopping of any biological activity. A regulated gas exchange with the atmosphere, which is indispensable not only for the soil life but also for the root breathing of plants, becomes impossible due to the lack of capillary pores. The consequence of such unfavorable physical and biological conditions in this soil is the stunting of germinating grain and the loss of two to four crops in a crop rotation of 5 years.

To create a normal crumb structure the following steps were taken:

At the end of March, after the finish of the frost period and the drying off of the field, 6,000 kg/hectare of finely ground limestone were thoroughly incorporated into the top horizontal layer of 7 to 8 cm depth.

In the second and third operations, two tractors followed in immediate succession. The first one sprayed a dilute aqueous acidic silicate suspension from a plant-protective spraying apparatus. The second one thoroughly incorporated the frothing reaction mass of soil particles, limestone, and acidic silicate suspension to a depth of approximately 8 cm.

This treatment lead to an 8 cm layer, crumbly throughout, which is sufficient to secure the strong germination and the root growth of the spring wheat plants, until they are strong enough to grow through the denser, deeper layer. On a matching field with equal cultivation and equal lime application but without acidic treatment, the young absorbent roots of the grain seeds died after warping and yellowing in a depth of from 4 to 7 cm, so that the sowing was fruitless.

The spraying acidic silicate suspension had the following composition:

For each 1000 m²
- 6000 l water
- 200 l sodium silicate solution (37° Be, mol ratio $Na_2O:SiO_2=1:3.3$ with an addition of 2 wt. % of urea).
- 100 l app. 55% technical phosphoric acid solution.

The growth on the test lots proceeded normally while the untreated lot had to be ploughed up.

EXAMPLE II

On a mountain slope adjacent to a viniculture the slight, weathered layer on a gypsum Keuper is so clayey that only weeds which can endure a strong lack of air in the soil can thrive. The sloping lot was prepared and made suitable for viniculture.

To this purpose the following steps were taken:

First, in a local restriction of the operation three ditches, similar to drainage ditches with vertical walls, were filled with treated soil. The ditches were made in the direction and in the distance of the vines to be planted; two of them serve for the planting of the seedlings, the middle ditch, situated between them, serves to conserve for the run off of the rain water, which otherwise would run off without penetrating into the soil.

Into the pulverized virgin soil were then worked in together, for each running meter of the ditches, 100 gm of finely ground chalk, previously mixed with 80 gm of air-dried, powdery alkali metal silicate hydrate (solid content, 65 wt percent of $SiO_2$, 19.4 wt percent of $Na_2O$, mol ratio $SiO_2:Na_2O=3.35:1$) and 100 gm of triple phosphate. Since the soil was moist at the start of the work in early spring, the reaction between the calcium carbonate and the acidic calcium phosphate began quickly. The soil crumbs formed are largely water stable and yield optimum water-air exchange in the 10 cm wide and 16 cm deep ditches which were filled with the treated soil. The young vines grow well on the technically created location. Excess rain water is conserved and run off through the soil-drainage line passing through the middle of the interspace between the rows of vines.

EXAMPLE III

COMPARATIVE TESTS OF SOIL IMPROVEMENT

By the process of the invention, clayey soils were improved by working into the soil calcium carbonate together with an acidic material from the group
  a. acid-adjusted acidic silica sol
  b. acid-adjusted alkali metal silicate suspensions
  c. mixtures of alkali metal silicates and acidic calcium phosphates (commercial "Triple Phosphate" —$P_2O_5$—content = 48 percent)

Calcium carbonate and the acidic materials were applied in approximately stoichiometric amounts.

The below listed tests have the purpose of showing that through the above described process a quite considerable improvement of the soil occurs, that can be made visible by an aggregation of the soil particles.

A. Experimental (Analysis of sieving and of aggregates)

The percentage of aggregates, not larger than 0.2 mm in clayey soils was determined by the method of Tjulin, improved by Meyer and Rennenkampf, as developed by the Technische Hochschule, Braunschweig, Germany.

According to this method, the air-dried soil, treated each time in the listed manner, or also untreated, is crushed mechanically. Subsequently the particles whose diameter is 1 – 8 mm are screened off and slightly moistened with water or with a solution containing the additions, to be examined.

The thus pre-treated aggregates are subjected to disintegration by several dippings in water in a pendulum apparatus. Subsequently a screening of the aggregates over 0.2 mm is carried out.

The results are thereby compared with untreated aggregates (no additives) as well as with aggregates that are obtained, if a potassium silicate solution or if calcium carbonate and acidic calcium phosphate are used. In this connection it is pointed out that the combination of calcium carbonate and acidic calcium phosphate for soil treatment is, in itself, not previously known.

The numerical values listed in the following tables are in each case average values that were obtained on the basis of several tests, carried out successively with the same soils under the same conditions. In the following Table I the results in the left column are with the untreated sample, the results in the center column are with calcium carbonate and acidic phosphate, and the results in the right column are with calcium carbonate and acidic silica sol (a), or acid-adjusted alkali-metal silicate suspensions (b), or a mixture of alkali-metal silicate and acidic calcium phosphate (c), all in approximately stoichiometric amounts. The acid utilized for the acid-adjustment of (a) and (b) was phosphoric acid. The resultant solutions had a pH of about 3. In the following Table II, the results in the left column are with the untreated sample and the results in the right column are with a soil treated with a potassium silicate solution.

In the test series A a humus containing clayey soil was used. In the test series B the tests were carried out with a clayey virgin soil (mountain clay), while in the test series C a clayey salt containing mud was used.

For each test series in the different soils, calcium carbonate in an amount of 100 gm/m² were worked in (depth of working-in 8 cm) and subsequently the soil was treated with a solution or suspension of the above named acidic materials. As a further control test, a treatment of the soils with calcium carbonate and acidic calcium phosphates was carried out. Also as a further control test, a treatment with a potassium silicate solution was carried out. The amount of the various acidic agents, that were supplied in this way to the soils was in a stoichiometric proporation to the worked in amounts of calcium carbonate. Then the soils were left alone for some time and subsequently the aggregate formation was examined by the above described method of Tjulin. Each time one sample was left untreated for comparison. The single test series were repeated several times, in order to be able to determine average values.

B. Results

The results with the various treated or untreated soils and the various acidic materials that were used in combination with calcium carbonate, are listed in the following table. The different clayey soils, designated with A, B and C were already more closely explained in the experimental part. The various figures give the percentage of aggregates that are larger than 0.2 mm. The left column gives the results with the untreated soil while in the center column the results are given that were obtained in a treatment with calcium carbonate and acidic phosphate. Finally, in the right column the results are listed that were obtained by the addition of calcium carbonate in combination with acidic material, namely a. acid-adjusted acidic silica sol
b. acid-adjusted alkali-metal silicate suspensions
c. mixtures of alkali-metal silicates and acidic calcium phosphates in the listed sequence.

TABLE I

| Type of Soil | Share in % of over 0.2 mm | | |
|---|---|---|---|
| | Untreated | Acidic phosphate + $CaCO_3$ | Acidic materials containing $SiO_2$ + $CaCO_3$ |
| A | 39.0 | 57.5 | 66.8 (a) |
| B | 17.5 | 24.2 | 43.6 (b) |
| C | 12.1 | 31.3 | 43.4 (c) |

In a further test, the soils of the types B and C were treated by the described method of Tjulin with a corresponding amount of potassium silicate solution and the percentage of the particles above 0.2 mm determined. The results are reproduced in Table II.

TABLE II

| Type of Soil | Share in % of over 0.2 mm | |
|---|---|---|
| | Untreated | Potassium Silicate Solution |
| B | 17.5 | 19 |
| C | 12.1 | 13.9 |

C. Discussion of the Results

The numerical values, listed in the right column of the Table I, for percentage of the aggregates, show clearly that an improved aggregate formation is obtained if calcium carbonate and the listed acidic materials are added to the various clayey soils. These results are surprisingly particularly good if acid-adjusted acidic silica sol (cf. test series a) or acid-adjusted alkali-metal silicate suspensions (cf. test series b) or mixtures of alkali-metal silicates and acidic calcium phosphates (cf. test series c) are worked into the soil. The control tests utilizing untreated soils, as well as the tests that were conducted with calcium carbonate and acid-adjusted phosphates, as in Table I, or the tests that were conducted with a corresponding amount of a potassium silicate solution, as in Table II, make it clear, that a particularly unexpected synergistic increase occurs in the above described tests, if the soils are treated with calcium carbonate and one of the acidic silicon-containing agents of the invention of (a), (b) or (c).

In addition, as shown in Example I, treatment of the soil with calcium carbonate alone does not lead to any improvement in soil conditions of clayey soils. The conventional silicate compounds suggested for the treatment of clayey soils are alkaline or only very weakly acidic, such as silica sols. A solution of silicic acid (silica sol) is an exceptionally weak acid, weaker than carbonic acid and would not liberate carbon dioxide from a calcium carbonate.

The preceding specific embodiments are illustrative of the practice of the invention. It is to be understood, however, that other expedients known to those skilled in the art may be employed without departing from the spirit of the invention.

We claim:

1. A process for improving clayey soils for cultivation consisting essentially of incorporating from 20 to 750 gm/m² of a carbonate of calcium into clayey soils and inducing a gas formation in said soils by chemical reaction by an acidic treatment of said soil with an acidic material selected from the group consisting of acidic silica sols, acid-adjusted sodium silicate suspensions and mixtures of sodium silicates and acidic calcium phosphates, in approximately the stoichiometric amount based on the carbon dioxide content of said carbonate, whereby porous aggregates are built up.

2. The process of claim 1 wherein said acidic material contains phosphoric acid.

3. The process of claim 1 wherein said acidic material has a pH of between 2 and 5.

4. The process of claim 1 wherein said gas formation is brought to an increased effect on said soil by soil tilling.

5. The process of claim 1 wherein said gas formation in said soils is induced by incorporation into said soil of a solid mixture of sodium silicates and acidic calcium phosphates capable of reacting with said carbonate of calcium in the presence of moisture to induce said gas formation.

* * * * *

UNITED STATES PATENT OFFICE
CERTIFICATE OF CORRECTION

Patent No. 3,854,241　　　　　　　　Dated December 17, 1974

Inventor(s) Friedrich Zimmermann et al.

It is certified that error appears in the above-identified patent and that said Letters Patent are hereby corrected as shown below:

-- [73] Assignee: Henkel & Cie GmbH, Dusseldorf, Germany --.

Column 3, line 7, "sttuctures" should read -- structures --.

Signed and Sealed this eleventh Day of November 1975

[SEAL]

Attest:

RUTH C. MASON
Attesting Officer

C. MARSHALL DANN
Commissioner of Patents and Trademarks